R. T. PARKER.
SPRING CLAMP.
APPLICATION FILED MAR. 17, 1919.

1,312,746.

Patented Aug. 12, 1919.

INVENTOR.
Roy T. Parker.
By Wilhelm & Parker.
ATTORNEYS.

UNITED STATES PATENT OFFICE.

ROY T. PARKER, OF BUFFALO, NEW YORK.

SPRING-CLAMP.

1,312,746.  Specification of Letters Patent.  Patented Aug. 12, 1919.

Application filed March 17, 1919. Serial No. 283,162.

*To all whom it may concern:*

Be it known that I, ROY T. PARKER, a citizen of the United States, residing at Buffalo, in the county of Erie and State of New York, have invented a new and useful Improvement in Spring-Clamps, of which the following is a specification.

This invention relates to spring clamps for holding the hood or other part of an automobile in closed or operative position.

In some types of motor vehicles the hood is clamped into its closed or operative position by means of a thumb nut which engages a threaded bolt pivotally secured on a fixed part of the frame. The thumb screws are objectionable since they become loose when the vehicle is running, and consequently cause rattling and possibly injury to the hood or other parts of the vehicle. In order to replace these hood clamps by spring clamps, it was heretofore necessary to remove the threaded bolts and the plates to which the bolts are hinged from the fixed part of the vehicle and to attach the spring hood clamps thereto, which involved a considerable amount of work and expense.

The objects of the invention are to devise a spring clamp of this kind which may be readily placed on an automobile or other vehicle to replace the thumb nuts, and which can be secured on the threaded bolt, thus eliminating the necessity of removing the bolt from the frame of the vehicle; also to provide a spring hood clamp of this kind in which the tension of the spring is readily adjustable; also to improve the construction of devices of this kind in other respects hereinafter specified.

Figure 1:
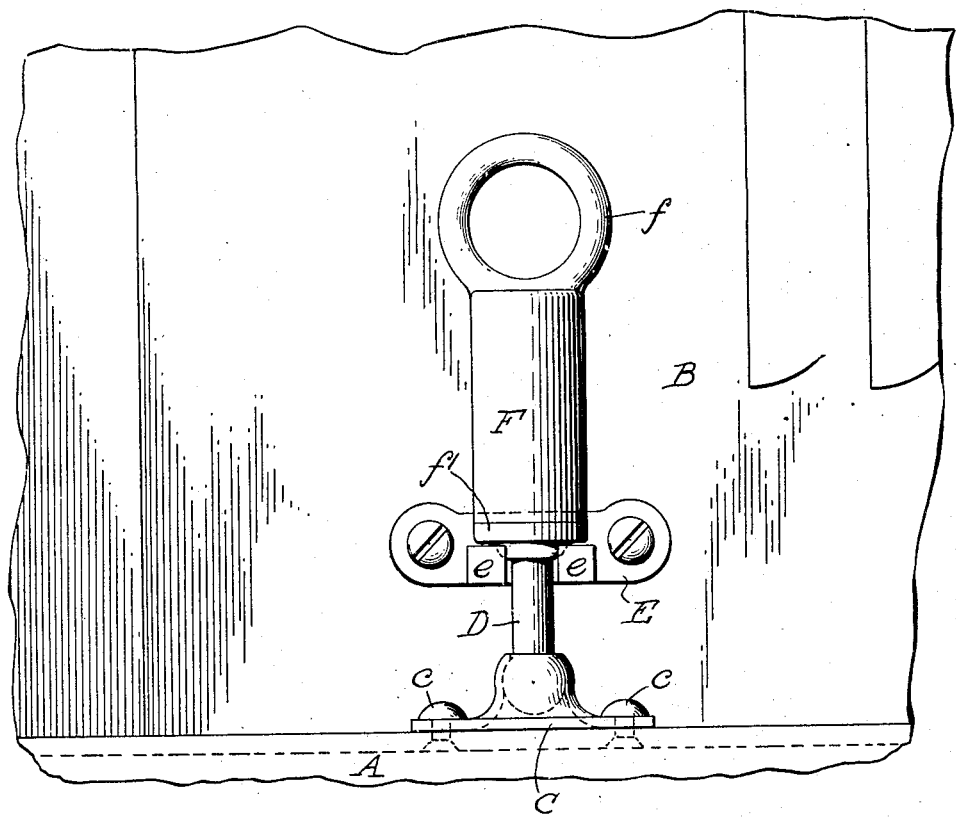
Figure 1 is a fragmentary side elevation of the hood of a vehicle and the spring clamp in its operative position.
Figure 2:
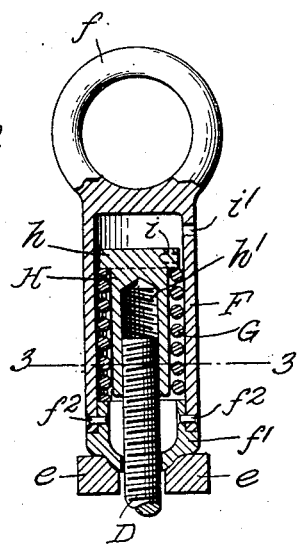
Fig. 2 is a central sectional elevation thereof.
Figure 3:
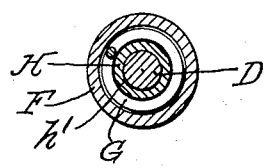
Fig. 3 is a transverse sectional plan view thereof on line 3—3, Fig. 2.
Figure 4:
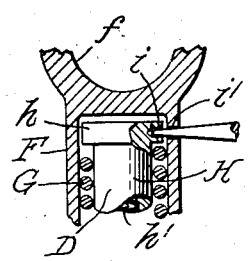
Fig. 4 is a fragmentary sectional elevation thereof showing the means for securing the spring clamp on a threaded bolt and for adjusting the tension of the spring.

A represents a fixed part of the frame or body of a vehicle, and B represents a portion of the hood or other hinged or movable part of the vehicle, which is to be clamped or secured on the fixed part A. C represents a plate or base on which a bolt D is pivotally secured and which may be secured to the base in any suitable manner, for example, by means of rivets $c$ or the like. In the construction shown, the bolt D has a ball and socket connection with the plate C, but any other kind of hinge or pivotal connection may be employed. In clamps of this kind, as frequently employed, the bolt D is provided with a thumb nut (not shown) engaging the threaded portion of the bolt, and adapted to bear against outwardly projecting portions $e$ of a bracket E secured on the hood B. All of these parts may be of any usual or suitable construction and of themselves constitute no part of this invention.

The spring clamp which is adapted to replace the thumb nut usually employed, consists of a casing or housing F having the usual handle portion $f$ by means of which the spring clamp may be moved into or out of its operative position. The housing F is hollow and contains a spring G and a spring compressing member or follower H. The spring G is preferably a coil spring fitting loosely into the interior of the housing F and is held in place in the housing by means of a cap or sleeve $f'$ which is adapted to fit in the end of the body portion F of the housing and is rigidly secured to the housing after the spring G and the compressing member H have been inserted therein by means of pins $f^2$ or the like. The lower end of the cap is preferably provided with a hole for the bolt D and is preferably shaped to conform with the projections $e$ of the hood, to seat thereon. Any other means for confining the spring in the housing may be used.

The inner end of the cap or sleeve forms a shoulder against which one end of the spring G bears, and the other end of the spring engages a head or enlarged portion $h$ of the spring compressing member H in such a manner that the spring resists the movement of the compressing member toward the opening in the housing F. The spring compressing member is provided with a central hole $h'$ which is threaded in such a manner as to correspond with the thread of the bolt D. Consequently, in applying the spring clamp to the bolt D it is only necessary to insert the bolt into the opening in the cap $f'$ of the housing and to turn the housing so as to cause the thread of the bolt to engage with the thread in the hole $h'$ of the compressing member and thus secure this member to the bolt D. Ordinarily the pressure with which the spring G presses the compressing member against the inner end of the hollow portion of the housing is sufficient to permit the bolt D to be threaded into the compressing member H. In order to avoid any difficulty in securing the compressing member to the bolt D, the member is preferably provided with a hole $i$ which is adapted to register with a hole $i'$ in the housing. By inserting a nail or other device through the hole $i'$ into the hole $i$, the compressing member may be positively held against turning relatively to the housing so that the spring clamp may be easily screwed onto the bolt D. Any other means for securing the spring compressing member to the bolt D may be employed.

In the operation of the device, the operator takes hold of the handle portion $f$ of the housing and pulls the same against the action of the spring to bring the cap portion $f'$ of the housing into engagement with the projection portions $e$ of the bracket E. The hood will then be securely clamped against the fixed part A of the vehicle with a spring tension which prevents rattling and also prevents the loosening or turning of the compressing member H relatively to the bolt D. The tension with which the spring clamp presses against the projections $e$ of the hood can be varied by screwing or unscrewing the spring compressing member H relatively to the bolt D.

The device has the advantage that it can be readily applied to any vehicle in which the hood or other movable part is secured by means of a thumb screw and has all the advantages of the usual spring clamping devices, and has the further advantage of being adjustable to vary the tension of the spring as may be desired.

I claim as my invention:

1. The combination with two parts, one of which is movable relatively to the other, and a bolt pivotally secured to one of said parts and having a threaded portion, of a spring clamping device including a body portion and a spring-pressed member slidable with regard to said body portion, said spring-pressed member having a socket in which the threaded portion of said bolt is adapted to engage to connect said clamping device with said bolt, said clamping device being adapted to engage the other part for clamping said parts together.

2. The combination with two parts, one of which is movable relatively to the other, and a bolt pivotally secured to one of said parts, of a clamping device including a body portion, and a spring-pressed member slidable with regard to said body portion and having a portion adapted to engage said bolt for securing said clamping device to said bolt, said clamping device being adapted to engage the other part for clamping said parts together, said spring-pressed member being adjustable relatively to said bolt to vary the action of said spring.

3. The combination with an automobile hood, and a bolt pivoted to the automobile in operative relation to said hood, of a clamping device including a housing, a spring in said housing, and a spring compressing member slidably arranged in said housing and having a threaded hole into which the end of said bolt can enter, said spring compressing member being adjustable relatively to said bolt to vary the action of said spring.

4. The combination with an automobile hood, and a bolt pivoted to the automobile in operative relation to said hood, of a clamping device including a housing, a spring in said housing, a spring compressing member slidably arranged in said housing and having a threaded hole into which the end of said bolt can enter, said spring compressing member being adjustable relatively to said bolt to vary the action of said spring, and coöperating parts on said housing and said spring compressing member with which an object is adapted to engage for holding said compressing member against movement relatively to said housing to facilitate the securing of said member on said bolt.

5. The combination with an automobile hood, and a bolt pivoted to the automobile in operative relation to said hood, of a clamping device including a housing, a spring in said housing, and a spring compressing member slidably arranged in said housing and having a threaded hole into which the end of said bolt can enter, said spring compressing member being adjustable relatively to said bolt to vary the action of said spring, said housing and spring compressing members having holes adapted to register whereby an object may be inserted into said holes to hold the spring compressing member against turning relatively to said housing when said member is being secured on said bolt.

Witness my hand, this 14th day of March, 1919.

ROY T. PARKER.

Witnesses:
F. E. PROCHNOW,
A. L. McGEE.